Patented June 28, 1949

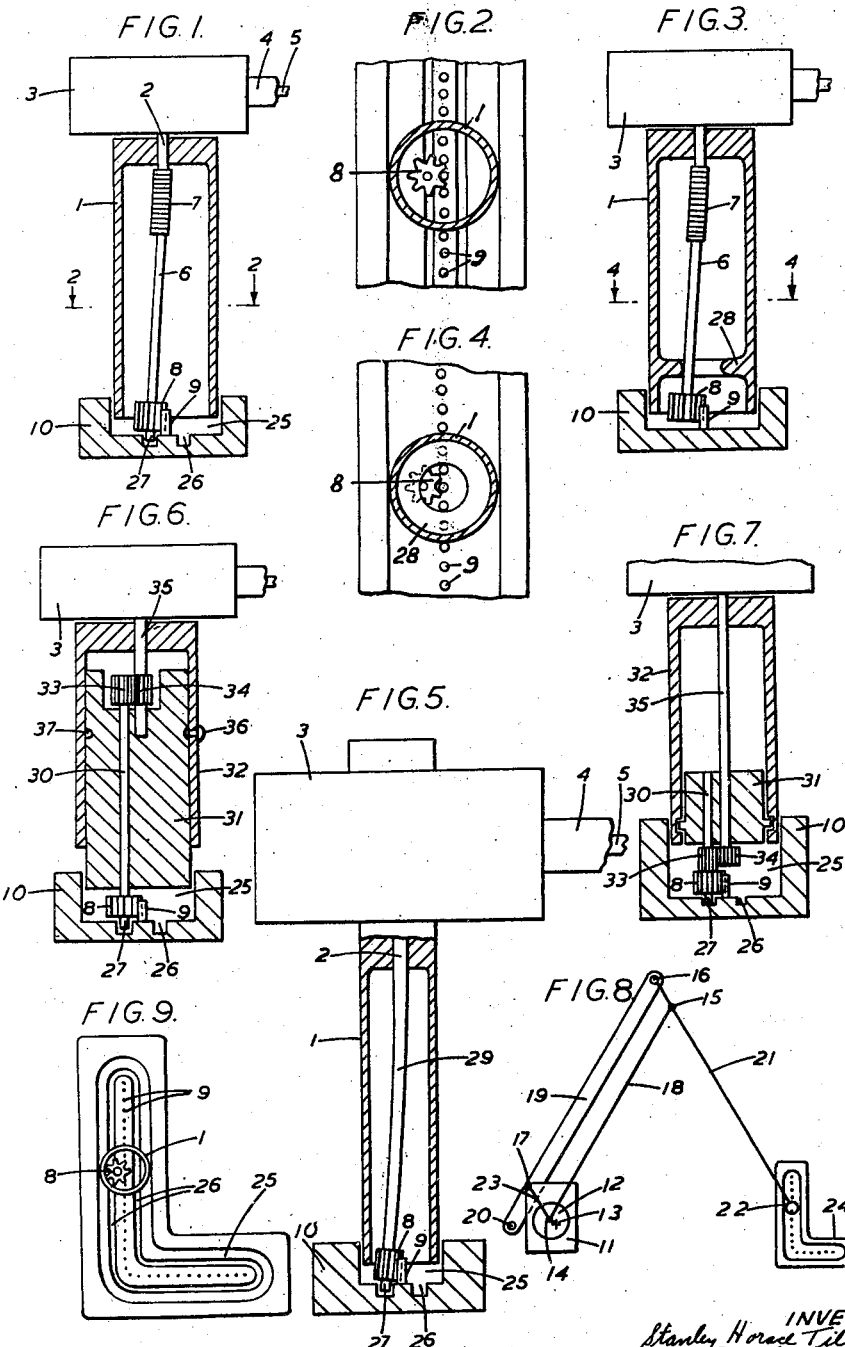
June 28, 1949.  S. H. TILLETT ET AL  2,474,406
APPARATUS FOR REPRODUCING
CHARACTERS AND THE LIKE
Filed Nov. 30, 1945

2,474,406

UNITED STATES PATENT OFFICE 2,474,406

APPARATUS FOR REPRODUCING CHARACTERS AND THE LIKE

Stanley Horace Tillett, Wanstead, London, and Bert David Feild, Romford, England, assignors to Tillett's Cotton Marking Machines Limited, London, England, a British company Application November 30, 1945, Serial No. 631,854
In Great Britain October 23, 1945

13 Claims. (Cl. 112—102)

This invention relates to apparatus operating on the principle of copying a predetermined design, character or group of characters, the apparatus comprising four essential elements, (1) an element which will hereinafter be referred to as the "master," shaped to the design, character or group of characters to be reproduced, (2) a tracing unit which in the operation of the apparatus is caused automatically to move along the outline of the "master," that is to say, the course of the design, character or group of characters to which the "master" is shaped, (3) a copying unit and (4) an operative connection between the tracing unit and the copying unit, for example a pantograph, effective to cause the copying unit to move along a course which corresponds to the course followed by the tracing unit. More particularly, the invention relates to apparatus for marking fabrics with such designs, characters or groups of characters by means of a sewing machine, the arrangement being such, for example, that the "copying unit" of the apparatus is constituted by a work plate, adapted to support the fabric during the marking operation in relation to the needle of the sewing machine, with the result that it is moved along a path corresponding to the shape of the design, character or group of characters traced over by the tracing unit as the needle of the sewing machine operates in the fabric to form a marking in stitches therein. Such an apparatus forms the subject matter of United States Patent No. 2,264,779 and from this point of view the present invention may be regarded as a development of the invention described and claimed in that patent. It is to be understood, however, that the invention is not limited to apparatus for marking fabrics. Thus, it is applicable also to apparatus for cutting or welding metals by means of an oxy-acetylene or like cutting or welding tool, and apparatus for engraving or etching surfaces. In the case of a cutting or welding apparatus as referred to and similarly in the case of an engraving or etching apparatus, the cutting or welding tool or as the case may be, the engraving or etching tool, would constitute the "copying unit" of the apparatus, or alternatively the copying unit could be constituted by a work support which, after the manner of the work plate of a fabric marking apparatus as referred to above, is moved in the operation of the apparatus in relation to a cutting or welding or, as the case may be, engraving or etching tool, which in this event would occupy a stationary position, the work being moved past it.

The fabric marking apparatus forming the subject matter of the Patent No. 2,264,779 comprises (A) a toothed rack shaped to the form of the character to be reproduced, the direction of length of the teeth of the rack being substantially perpendicular to the general plane of the character; (B) a driven pinion engaging with the rack; (C) a rotatable driving member drivingly connected to the pinion and disposed with its axis of rotation substantially parallel with said direction of length of the teeth of the rack; (D) guide means whereby as the pinion is driven by the rotatable driving member and in consequence is caused to move along the rack, carrying the rotatable driving member with it, the rotatable driving member is caused to follow a course which is determined by the shape of the rack, these parts being combined with (E) a support for the fabric to be stitched, which support occupies or is adapted to occupy an operative position in the sewing machine in relation to the needle thereof in which the fabric on the support is presented to the needle for stitching thereby, and (F) mechanism, for example, a pantograph, so operatively connecting the rotatable driving member to the support for the fabric that the support is caused, relatively to the needle, to reproduce the movements of the rotatable driving member. In the apparatus of this patent, therefore, the part (A) above referred to constitutes the "master" of the apparatus, the parts (B) and (C) constitute together and in association with the part (D) the "tracing unit," the part (E) constitutes the "copying unit" and the part (F) constitutes the operative connection between the tracing unit and the copying unit.

The present invention also concerns an apparatus of this general description, that is to say, an apparatus employing the six parts (A), (B), (C), (D), (E), and (F) as set forth in the preceding paragraph, it being understood, however, that, as already remarked, the invention is not limited to a fabric marking machine but is of broad scope in this respect as applicable to apparatus for reproducing designs, characters or groups of characters generally, including specifically apparatus for cutting or welding metals and the like and apparatus for engraving or etching surfaces.

Heretofore, in such apparatus, the arrangement has been one in which in the reproduction of a character of a configuration such that the driven pinion (B) has had to move first along one side of the rack and then after rolling around the end of the rack, along the opposite side thereof, the rotatable member (C) has moved along a double path corresponding to the double path of the pinion first along one side of the rack and then along the other side thereof, with the result that the copying unit (E) has similarly moved along a double path, giving in the case of a fabric marking machine a double outline to the letter or other character stitched in the fabric. This is an undesirable effect in many instances, particularly in the case of a fabric marking machine, and it is the object of the present invention to provide an improvement which will avoid it and enable a single outline effect to be obtained wherever required.

According to the present invention, an automatic character reproducing apparatus of the type described is provided, wherein the driven pinion of the tracing unit is flexibly or swivelably connected to the rotatable driving member (C) of the unit so as to have a freedom for universal movement in a plane substantially perpendicular to the direction of length of the teeth of the rack, thereby enabling it to operate on either side of the rack and at the end thereof to roll therearound from the one side of the rack to the other, and the rotatable driving member is guided for movement along a single path only, corresponding substantially to the shape of the rack, irrespective of whether the pinion is operating at one side of the rack or the other, means being provided tending to maintain the pinion in mesh with the rack at all times as it moves therealong.

In this way it is possible to provide an arrangement in which a single outline effect as aforesaid is obtained and, as will be appreciated, the invention is of wide scope as regards constructional details, for example as regards the form of the operative connection between the rotatable driving member (C) and the driven pinion, the form of the means used for guiding the rotatable driving member along a single path only and the form of the means tending to maintain the pinion in mesh with the rack.

According to a preferred form of the invention, the rotatable driving member of the tracing unit is drivingly connected to the pinion through the intermediary of a flexible shaft, the flexing of which provides the freedom for universal movement to the pinion.

The invention will now be further described with reference to the accompanying drawings which illustrate several embodiments by way of example, as applied more especially to a fabric marking machine constructed and operable, save for the improvement according to the present invention, in the manner set forth in the specification of the aforesaid Patent No. 2,264,779, the drawings being confined to a showing of the "tracing unit" and associated "master" of the complete apparatus in view of the fact that the improvement according to the present invention concerns solely these parts of the apparatus. For further details as to the construction, arrangement and manner of operation of the complete apparatus, the reader is referred to the aforesaid specification of Patent No. 2,264,779.

In the drawings,

Figure 1 is a vertical section through the tracing unit and associated "master" of the improved apparatus of the invention, according to one of the aforesaid embodiments thereof;

Figure 2 is a horizontal section through Figure 1 on the section line 2—2 thereof;

Figures 3 and 4 are views similar to Figures 1 and 2 but illustrating another of the embodiments referred to;

Figure 5 is a view similar to Figure 1 but illustrating a third embodiment, this particular embodiment having been found to be specially satisfactory in the actual use of the invention;

Figures 6 and 7 are views similar to Figures 1 and 3 but illustrating a fourth and fifth embodiment respectively;

Figure 8 is a diagrammatic view illustrating the complete apparatus, as regards the essentials thereof, as hereinafter more particularly explained, and Figure 9 is a plan view of a typical "master" of the apparatus, the "master" in this case being shaped to the letter L and the figure showing the adjacent portion of the tracing unit with the driven pinion thereof in mesh with the rack of the "master."

Like reference numerals indicate like parts in the various figures.

Before proceeding to describe the tracing unit as shown in the figures, it is to be remarked here that the figures are largely diagrammatic and are not intended to be working drawings but simply drawings illustrating the general principle of the invention. Consequently, the constructional details as shown in the drawings may be varied widely in any given case of practical execution of the invention, to suit for example the requirements of design of the apparatus or the preference of the designer.

Referring now to Figures 1 and 2, the tracing unit shown in these figures comprises, briefly, a tubular body portion 1 open at the lower end and closed at the upper end. Fast with the body portion 1 and disposed coaxially therewith is a shaft 2, the body portion 1 and the shaft 2 being disposed vertically in the apparatus when the tracing unit is in the operative position in relation to the "master."

The body portion 1 together with the shaft 2 are supported in a dependent manner from a structure 3 which in turn is supported upon the free end of a "control rod" 4 as referred to in the specification of Patent No. 2,264,779, the connection between the structure 3 and the control rod 4 being a rigid one.

Extending concentrically through the control rod 4, which is tubular, is a shaft 5. This shaft corresponds to the shaft denominated by the reference letter $F^2$ of the form of apparatus described in the specification of Patent No. 2,264,779. It is drivingly connected to the shaft 2 through the intermediary of bevel gearing (not shown). Alternatively, it may be connected thereto through the intermediary of a worm on the shaft 5 and a co-operating worm wheel on the shaft 2. Indeed, it may be connected to the shaft 2 in any convenient manner at all, according again to the requirements of the apparatus or the preference of the designer thereof.

The unit constituted by the body portion 1 and the shaft 2 is, therefore, revoluble around the axis of the shaft 2 relatively to the structure 3 and with it, also revoluble and forming in effect a part of the unit, is a spindle 6 drivingly connected to the shaft 2 through the intermediary of a flexible coupling 7 and carrying at the lower end a pinion 8 fast with the spindle.

As shown, the pinion 8 meshes with a row of pegs 9 upstanding from the base of a plate 10 forming the body portion of the "master" of the apparatus. The row of pegs 9 forms a rack along which the pinion 8 travels as it revolves under drive from the shaft 5 through the gearing housed within the structure 3, the shaft 2, the flexible coupling 7 and the spindle 6, it being understood that the shaft 5 is in turn driven in the operation of the apparatus by a motor forming a part thereof as described in the specification of Patent No. 2,264,779, but not shown in the drawings accompanying the present specification. The said motor operates to drive the shaft 5 and therethrough the pinion 8, with resulting travel of the pinion along the rack 9 and consequential movement of the tracing unit as a whole along the course of the rack as the sewing machine which stitches a copy of the character represented by the shape of the rack in the fabric to be marked operates. The manner of operation of the apparatus in this respect is clearly described in the specification of Patent No. 2,264,779. It will not be further described in the present specification, therefore, save with reference to Figure 8 of the drawings, which will now be referred to.

As shown in this figure, the complete apparatus comprises at the reproducing end of the apparatus a clamping plate 11 for the fabric to be marked. This clamping plate has in it an aperture 12 through which the needle of the sewing machine extends as it stitches the character to be reproduced upon the fabric, the position of the said needle being indicated at 13 in the figure. The clamping plate 11 is movable in a horizontal plane with a pivot 14 constituting one of the pivots of a pantograph mechanism. This mechanism comprises the pivot 14 and three other pivots 15, 16 and 17. The pivots 14 and 15 are connected by a rigid link 18. The pivots 16 and 17 are carried upon an arm 19 pivoted at 20 to swing in a horizontal plane about the axis of that pivot 20, the pivot 16 being, therefore, at the free end of the arm. The pivots 15 and 16 are carried upon a second arm 21 at the free end of which is the tracing unit of the apparatus, shown diagrammatically at 22 in the figure. The pivots 14 and 17 are connected by a second rigid link 23 which, as shown, is parallel to the arm 21. The arrangement, therefore, as regards the form of the operative connection between the tracing unit of the apparatus and the copying unit thereof as hereinbefore referred to, is similar to that in the apparatus of the Patent No. 2,264,779, as will be seen upon reference to the specification and drawings of that patent, and as there set forth it is one in which any movement of the tracing unit 22 along the rack of the "master," which is shown at 24 in the figure, will be reproduced by a corresponding movement of the clamping plate 11 relatively to the axis 13 of the needle of the sewing machine.

It will be appreciated, therefore, that the arrangement as illustrated diagrammatically in Figure 8 is one in which the four essential elements, as enumerated under (1), (2), (3) and (4) in the opening paragraph hereof, of an apparatus of the character to which this invention relates are constituted, the element (1) by the "master" 24, the element (2) by the tracing unit 22, the element (3) by the clamping plate 11 and, of course, the parts that are associated therewith in the complete apparatus, and the element (4) by the pantograph mechanism comprised by the arms 19 and 21 and the links 18 and 23.

Referring again to the tracing unit and the associated "master" (see Figures 1 and 2), it will be observed that the plate 10 forming as above described the body portion of the "master" is formed with a groove 25 extending down into it from the upper surface of the plate. The "base" 10 aforesaid of the plate forms the bottom of this groove and, as shown, the rack 9 extends along the centre of the groove, the latter being, as appears from Figure 8, co-extensive with the rack and of the same course or configuration in plan view thereas.

At either side of the rack 9 is a smaller groove 26 extending down into the base of the plate 10 from the upper surface thereof and received in this groove is a projection 27 from the underside of the pinion 8. The projection 27 is circular in cross-section and is disposed coaxially with the pinion. It is fast with the pinion and may conveniently be constituted by the lower extremity of the spindle 6, the latter extending, therefore, completely through the pinion and projecting therefrom in the manner shown.

The purpose of the groove 26 and the projection 27 is to guide the pinion 8 as the latter makes its way along the rack, and thereby to maintain it positively in mesh with the rack.

The body portion 1 is guided, so as to move along the course of the rack, by the sides of the groove 25, the said lower end of the body portion, where this extends into the groove, having a free but fairly close fit with these sides.

The ends of the groove 25 are rounded, as shown in Figure 8, and the smaller grooves 26 continue around the end of the rack at each end thereof, so as to form in effect a continuous groove extending first along one side of the rack, thence around the end of the rack and thence along the opposite side of the rack, with the result that upon the tracing unit reaching the end of the rack, the pinion 8 is caused to remain in mesh therewith and so to roll around the last peg of the rack to the said opposite side thereof, whereupon it continues its travel along said opposite side, causing the unit to move now in the opposite direction from the direction in which it moved in approaching the said end of the rack.

It will be seen, therefore, that in accordance with the present invention, the arrangement is one in which the shaft 2, which constitutes the part of the tracing unit hereinbefore referred to as the "driving member" thereof, moves along a single path as the unit travels along the course of the rack, namely a path which at all times is vertically over and, therefore, coincides with the line along which the pegs 9 forming the rack are positioned. In consequence, since the "copying unit" of the apparatus (clamping plate 11) exactly follows the motion of said "driving member," its course also will be along a single path, with the result that the character as reproduced in stitching upon the fabric will have a single outline as hereinbefore described.

It will be appreciated that certain characters do not require that the driven pinion (8) of the tracing unit shall travel first along one side of the rack and then back along the opposite side. For example the letter O does not require this; the pinion in the case of this character can travel around the outside (or the inside) only of the rack, returning on that same side to the point from which it started. The same tracing unit, however, will generally have to be capable of use on either type of character—either the type (e. g. the letter L) in which the pinion has to move first along one side of the rack and then along the opposite side (i. e. in order to get back to the point along the rack from which it started) or the type (e. g. the letter O) in which the pinion can keep on the same side of the rack from start to finish of its travel therealong, and it will be seen that the unit of the present invention possesses this capability, owing to the freedom the pinion has for universal movement in a plane perpendicular to the direction of length of the teeth (pegs 9) of the rack.

Referring now to the embodiment of the invention illustrated in Figures 3 and 4, the sole difference between this embodiment and that of Figures 1 and 2 resides in the form of the means employed for positively keeping the pinion 8 in mesh with the rack 9. According to this embodiment, the means referred to comprises an annular stop 28 positioned in the path of universal movement of the spindle 6 so as to delimit the range of such movement radially of the axis of the body portion 1 and, therefore, in a direction to carry the pinion out of mesh with the rack.

In connection with the foregoing it should here be remarked that whilst it is generally necessary to provide a means such as the groove 26 (Figures 1 and 2) or the annular stop 28 (Figures 3 and 4) effective to keep the pinion in mesh by action of a positive (unyielding) nature, the scope of this invention is not limited to arrangements employing such means. For example, the necessary constraint upon the pinion to keep it in mesh with the rack could in some instances be derived from the stiffness of the flexible coupling 7 or from the stiffness of the flexible shaft in the event of the construction hereinafter described with reference to Figure 5 being employed. In the main, however, it is preferable to employ a positive-action means, as in that event it is possible to use a coupling which is relatively non-stiff (if stiff at all) and for this reason the less liable to impose undesirable strain upon the parts in transmitting the operating torque to the spindle 6. For example, it is possible in said event to use a coupling in the form of a universal joint (e. g. a Hookes joint).

The embodiment of the invention illustrated in Figure 5 is generally similar to that illustrated in Figures 1 and 2, the principal difference between the two embodiments being that whereas in the embodiment of Figures 1 and 2 the rotatable driving member (shaft 2) is drivingly connected to the driven pinion 8 through the intermediary of a rigid shaft 6 and a flexible coupling 7, the coupling intervening between the shaft 6 and the rotatable driving member (2), in the embodiment according to Figure 5 the rotatable driving member (2) is drivingly connected to the pinion through the intermediary of a flexible shaft 29, which may, as in the construction illustrated, be a continuation of the shaft 2, a material being employed for the shaft which is of a suitable degree of flexibility and resilience for the purposes of the invention. If desired, the shaft 2—29, the pinion 8 and the projection 27 may all be integral with one another, being composed accordingly of a single piece of metal cut to form the teeth of the pinion and turned down to a reduced diameter, to provide the shaft portions 2 and 29 and the projection portion 27. As before remarked, this particular embodiment of the invention has been found to be specially satisfactory and is the one which is being used in the actual practice of the invention.

The embodiment of the invention illustrated in Figure 6 is one in which the pinion 8 is in effect mounted for rotation in the unit. Thus, it is carried upon a spindle 30 freely revoluble in a cylindrical block 31 in turn freely revoluble in a cylindrical housing 32 therefor forming the body portion of the unit. At the upper end of the spindle 30 and fast with it is a second pinion 33 meshing with a third pinion 34 carried on and fast with a shaft 35 corresponding to the shaft 2 of the previously described embodiment, and as in the case of that shaft constituting the "rotatable driving member" of the unit. The block 31 is retained in the housing 32 axially thereof, for example by a locating pin 36 carried in the housing and projecting into a co-operating peripheral groove 37 in the block.

The remaining embodiment of Figure 7 is generally similar, the only difference between it and the embodiment of Figure 6 being that the gearing (pinions 33 and 34) is situated below the block, which also is of shorter axial length than in the arrangement according to Figure 6, and whereas in that arrangement the guiding surface on the unit which co-operates with the sides of the groove 25 of the body portion of the "master" to cause the unit and, therefore, the rotatable driving member thereof (shaft 35) to move in a single path along the course of the rack, is the outside of the lower portion of the block 31, in the arrangement according to Figure 7 the said guiding surface is, as in the case of the first described arrangements (Figures 1 and 2 and Figures 3 and 4), the outside of the lower portion of the housing 32.

In the case of either of the embodiments of Figures 6 and 7, the construction is one in which the pinion is completely free to follow the course or configuration of the rack and also upon reaching the end thereof to roll around the same as in the previously described arrangements, owing to the freely revoluble mounting of the block 31 in the housing for rotation about the axis of the driving shaft 35 and to the fact that this axis is at all times vertically over the line of the rack.

Finally, it is to be understood that the term "flexibly" as used herein includes an articulated joint, for example as indicated, a Hookes or like universal joint.

What we claim as our invention and desire to secure by Letters Patent of the United States is:

1. In a tracing unit for use in connection with an automatic character reproducing machine, the combination of a toothed rack shaped to the form of the character to be reproduced, the direction of length of the teeth of the rack being substantially perpendicular to the general plane of the character, a driven pinion engageable with the rack and movable therealong as it rotates, means tending to maintain the pinion in mesh with the rack as it moves therealong, a rotatable driving member for the pinion, connected to the latter through a yieldable connection which affords to the pinion a freedom for universal movement in a plane substantially perpendicular to said direction of length, thereby enabling it to operate at either side of the rack and on reaching the end thereof to roll therearound from the one side of the rack to the other, said driving member being disposable with its axis of rotation substantially parallel with said direction of length, and guide means for the driving member whereby as the pinion is driven and in consequence is caused to move along the rack, carrying the driving member with it, the driving member is caused to follow a single-outline course which is determined by the shape of the rack and is common to both sides of the rack as regards the operating position of the pinion in relation thereto.

2. In a tracing unit for use in connection with an automatic character reproducing machine, the combination specified in claim 1, wherein the connection between the driving member and the pinion is a resiliently flexible shaft.

3. In a tracing unit for use in connection with an automatic character reproducing machine, the combination specified in claim 1, wherein the connection between the driving member and the pinion is a shaft which is connected to the driving member through a coupling which is resiliently flexible both in a lateral sense and also torsionally.

4. In a tracing unit for use in connection with an automatic character reproducing machine, the combination specified in claim 1, wherein the connection between the driving member and the pinion is a shaft incorporating a universal joint.

5. In a tracing unit for use in connection with an automatic character reproducing machine, the combination specified in claim 1, wherein the means tending to maintain the pinion in mesh with the rack is a means acting positively to delimit the freedom for movement of the pinion in a direction away from the rack.

6. In a tracing unit for use in connection with an automatic character reproducing machine, the combination specified in claim 1, wherein the means tending to maintain the pinion in mesh with the rack is a guide track for the pinion whose course is parallel to that of the rack.

7. In a tracing unit for use in connection with an automatic character reproducing machine, the combination specified in claim 1, wherein said pinion has an axial projection, and the means tending to maintain the pinion in mesh with the rack is a groove forming a guide track for the pinion, said groove extending alongside the rack, parallel to the course thereof, and being arranged to be engaged by said axial projection.

8. In a tracing unit for use in connection with an automatic character reproducing machine, the combination specified in claim 1, the pinion being carried upon the lower end of a shaft included in the operative connection between the driving member and the pinion, the means tending to maintain the pinion in mesh with the rack being an annular stop disposed coaxially with the driving member, carried on a part which is movable as one therewith along the course of the rack and so positioned in the path of universal movement of the shaft as to be effective, by delimiting said movement in the direction away from the rack, to keep the pinion at all times in mesh therewith.

9. In a tracing unit for use in connection with an automatic character reproducing machine, the combination as described in claim 1, said driving member comprising a shaft, the yieldable connection between said driving member and said pinion including a shaft which carries said pinion at its end remote from said driving member and has at said end a freedom for universal movement in a plane substantially perpendicular to the axis of the shaft, the guide means for the driving member comprising a tubular body housing the shaft carrying the pinion and coaxial with the shaft forming part of the driving member, said driving member, pinion carrying shaft and tubular body forming a movable guided unit, said guide means also comprising a member defining a groove, said tubular body being arranged to extend into said groove with its periphery in engagement with the side walls of said groove to guide said driving member, said rack extending along the bottom of said groove.

10. In a tracing unit for use in connection with an automatic reproducing machine, the combination as described in claim 1, said driving member comprising a shaft, the said yieldable connection between said driving member and said pinion including a shaft carrying said pinion at its end remote from said driving member and having at said end freedom for universal movement in a plane substantially perpendicular to the axis of the said latter shaft, the guide means for the driving member comprising a tubular body housing the shaft carrying the pinion, and coaxial with the shaft forming part of the driving member, said driving member, pinion carrying shaft and tubular body formng a movable unit, said guide means also comprising a member defining a guide groove, said tubular body being arranged to extend into said groove with its periphery in engagement with the side walls of said groove to guide said driving member, said rack extending along the bottom of said groove, the means tending to maintain the pinion in mesh with the rack comprising an axial projection on the pinion arranged to engage in a groove which is provided in said groove defining member along the bottom and which extends alongside the rack, parallel to the course thereof.

11. In a tracing unit for use in connection with an automatic reproducing machine, the combination as described in claim 1, said guide means comprising a channel shaped member mounting said rack at the base thereof, and a tubular member encircling said yieldable connection, movable with said connection and said driving member as said pinion follows the course defined by said rack and confined for guide movement by said channel.

12. In a tracing unit for use in connection with an automatic reproducing machine, the combination as described in claim 1, said guide means comprising a pair of members, one within the other, the inner member being rotatable within the outer member, and a groove defining member carrying said rack along the base therealong, one of said pair of members extending into the groove of said latter member for guided movement therealong, said driving member comprising a shaft journalled in said outer member, said yieldable connection comprising a shaft journalled in the inner member and carrying said pinion at one end, and comprising also a gear transmission between said shafts.

13. In a tracing unit for use in connection with an automatic character reproducing machine, the combination specified in claim 1, wherein the guide means for the driving member is constituted partly by the side walls of a groove in a member carrying the rack between said side walls and along the bottom of said groove, and partly by a member movable with the driving member along the course of the rack as the pinion rotates, said last-mentioned member being in stationary relation to the axis of the driving member and having a part which extends into the groove so as to be located against movement relatively thereto laterally of the groove by said side walls.

STANLEY HORACE TILLETT.
BERT DAVID FEILD.

REFERENCES CITED

The following references are of record in the file of this patent:

UNITED STATES PATENTS

| Number | Name | Date |
| --- | --- | --- |
| 2,264,779 | Tillett | Dec. 2, 1941 |